(12) United States Patent
O'Coin

(10) Patent No.: US 10,857,834 B2
(45) Date of Patent: Dec. 8, 2020

(54) FILLED TIRE WITH LAYERS OF FILL HAVING OPEN VOIDS

(71) Applicant: Jalcos Holdings Inc., Burlington (CA)

(72) Inventor: Christopher O'Coin, Oakville (CA)

(73) Assignee: Jalcos Holdings Inc., Burlington (CA)

( * ) Notice: Subject to any disclaimer, the term of this patent is extended or adjusted under 35 U.S.C. 154(b) by 253 days.

(21) Appl. No.: 16/102,217

(22) Filed: Aug. 13, 2018

(65) Prior Publication Data

US 2020/0047554 A1 Feb. 13, 2020

(51) Int. Cl.
*B60C 7/10* (2006.01)

(52) U.S. Cl.
CPC ........ *B60C 7/102* (2013.01); *B60C 2200/065* (2013.01)

(58) Field of Classification Search
CPC ....... B60C 5/002; B60C 17/002; B60C 7/102; B60C 17/06; Y10T 152/10459; Y10T 152/10522
USPC ......................................................... 152/310
See application file for complete search history.

(56) References Cited

U.S. PATENT DOCUMENTS

| | | |
|---|---|---|
| 969,888 A | 9/1910 | Lighthouse |
| 1,009,752 A | 11/1911 | Huebner |
| 1,031,469 A | 7/1912 | Roberts |
| 1,176,511 A | 3/1916 | Zuber |
| 1,307,800 A | 6/1919 | Wohlgemuth et al. |
| 1,343,233 A | 6/1920 | Stander |
| 1,372,587 A * | 3/1921 | Andresen ................. B60C 7/12 152/319 |
| 1,407,730 A * | 2/1922 | Burgess ..................... B60C 7/12 152/315 |
| 1,511,175 A | 10/1924 | Ribarsch |
| 2,745,461 A | 5/1956 | Rossi |
| 3,195,601 A | 7/1965 | Travers |
| 4,197,893 A | 4/1980 | O'Coin |
| 4,371,023 A | 2/1983 | Campagna |

(Continued)

FOREIGN PATENT DOCUMENTS

| | | |
|---|---|---|
| CA | 1237050 A | 5/1988 |
| CA | 2010057 A1 | 10/1990 |

(Continued)

OTHER PUBLICATIONS

RubberMill, Hardness of Rubber, Oct. 21, 2016 (Year: 2016).*

(Continued)

*Primary Examiner* — Robert C Dye
*Assistant Examiner* — Farah Taufiq
(74) *Attorney, Agent, or Firm* — Shlesinger, Arkwright & Garvey LLP

(57) ABSTRACT

Tire includes a casing with an interior, and the casing has an inside diameter. A fill is provided in the interior of the casing. The fill includes a first layer and a second layer adjacent to the first layer. The first layer has an outside diameter and an inside diameter, and the outside diameter is the same as the inside diameter of the casing for contacting the casing. The first layer has a face and open voids. The open voids of the first layer have a first volume and are open to the face. The second layer has an outside diameter that is the same as the inside diameter of the first layer. The second layer has a face and open voids, and the open voids of the second layer have a respective first volume and are open to the face.

13 Claims, 8 Drawing Sheets

(56) References Cited

U.S. PATENT DOCUMENTS

| | | | |
|---|---|---|---|
| 4,440,208 | A | 4/1984 | Tricket et al. |
| 4,530,386 | A | 7/1985 | Nakahira |
| 4,722,377 | A | 2/1988 | Dobson |
| 5,271,665 | A | 12/1993 | O'Coin |
| 5,468,316 | A | 11/1995 | O'Coin |
| 5,681,411 | A | 10/1997 | O'Coin |
| 6,131,630 | A | 10/2000 | O'Coin |
| 6,578,613 | B1 | 6/2003 | O'Coin |
| 2002/0129883 | A1 | 9/2002 | O'Coin |

FOREIGN PATENT DOCUMENTS

| | | | | |
|---|---|---|---|---|
| DE | 2748886 | A1 | 5/1979 | |
| DE | 4014646 | A1 | 3/1991 | |
| DE | 4014646 | A1 | 10/1997 | |
| EP | 0175534 | | 3/1986 | |
| EP | 0175534 | A2 * | 3/1986 | ............. B60C 5/002 |
| GB | 2164903 | A | 4/1986 | |
| WO | WO1997003850 | A1 | 2/1997 | |
| WO | WO 2011104578 | A2 | 9/2011 | |

OTHER PUBLICATIONS

PCT Transmittal of International Search Report and Written Opinion in PCT/IB2019/000212, dated Jul. 19, 2019 (10 pages).
"Marathon Tyres" website with "Products" found at www.marathontyres.com.au/rl_rubberliners.html (3 pages) (undated).

* cited by examiner

FILLED TIRE WITH LAYERS OF FILL HAVING OPEN VOIDS

FIELD OF THE INVENTION

The present invention relates to a tire. More particularly, the present invention relates to a tire which includes a fill in the interior of the casing.

BACKGROUND OF THE INVENTION

Tires are known.

Tires which have a fill in the interior of the casing of the tire are known.

OBJECTS AND SUMMARY OF THE INVENTION

In sum, the invention includes a tire which has a casing defining an interior, the casing having an inside diameter. A fill provided in the interior of the casing, the fill includes a first layer and a second layer, and the second layer is adjacent the first layer. The first layer has an outside diameter and an inside diameter, and the outside diameter is the same as the inside diameter of the casing for contacting the casing. The first layer has a face and open voids, the open voids of the first layer having a first volume and being open to the face. The second layer has an outside diameter, and the outside diameter is the same as the inside diameter of the first layer. The second layer has a face and open voids, and the open voids of the second layer have a respective first volume and are open to the face.

The layer for the filled tire may include that a material of the second layer is the same as a material of the first layer.

The material of the fill may include natural rubber or synthetic rubber.

The material of the layer may have a durometer of 35 to 60.

Further, the number of layers, the configuration of the voids in the layer, the number of voids per layer, the durometer of the layer, the thickness of the layer, and the material of the layer may be chosen based on considerations, such as the intended use of the respective layer and a tire filled with one or more of the layers. The intended use may include the expected psi (pressure/square inch) of the filled tire. Those are merely examples of considerations that may be taken into account.

Further, the invention includes that when the tire is loaded the casing is compressed, each of the first and second layers is compressed, and the respective open voids of the compressed first and second layers are partially filled by the respective compressed first and second layers. Also, the respective partially filled open voids of the compressed first and second layers have a second volume, and the respective first volumes of the first and second layers are greater than the respective second volumes of the compressed first and second layers.

Likewise, each of the first and second layers may have a longitudinal axis, each is elongated along the longitudinal axis, and each has a first free end and a second free end spaced apart from the first free end. Each of the open voids of the respective first and second layers extends along the longitudinal axis of the first and second layers.

The tire likewise may include that each of the open voids of the respective first and second layers extends from the first free end to the second free end.

The tire likewise may include that each of the first and second layers has a longitudinal axis, each is elongated along the longitudinal axis, and each has a first free end and a second free end spaced apart from the first free end. Each of the first and second layers has a width, and each of the open voids of the respective first and second layers extends across the width at an angle of 30-40 degrees relative to the longitudinal axis of the first and second layers.

The tire may include a third layer adjacent the second layer. The tire may further include that third layer is directly adjacent the second layer. Likewise, the tire may include that second layer is directly adjacent the first layer.

Relative terms such as left, right, up, and down are for convenience only and are not intended to be limiting.

DETAILED DESCRIPTION OF THE INVENTION

Figure 1A:
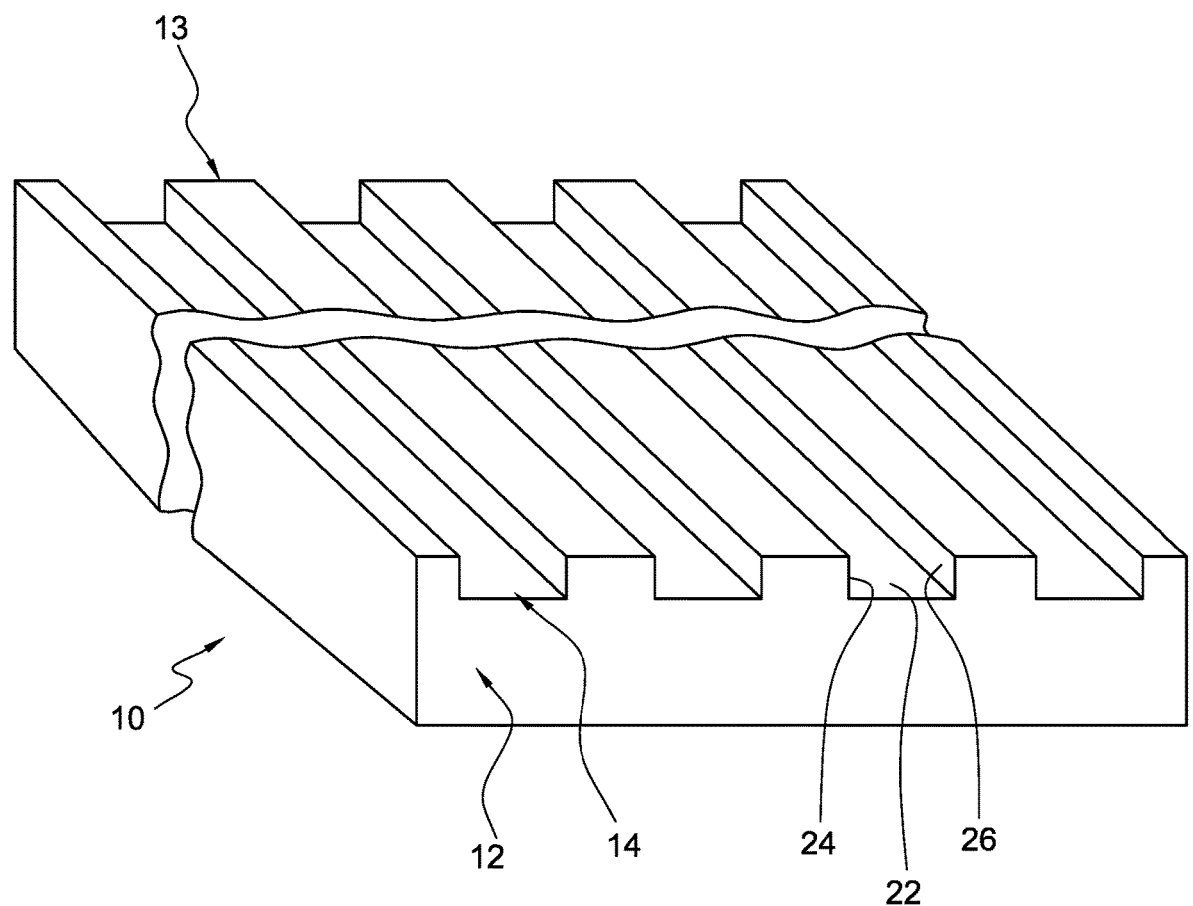
FIG. 1A is front perspective view of an embodiment of a layer having open voids.

FIG. 1A shows an embodiment of a layer 10 having open voids 14 according to the invention.

Layer 10 may be elongated and have a first free end 12 and a second free end 13 spaced apart from the first free end, as shown.

Open voids 14 may include a lower face 22, a left face 24, and a right face 26. Lower face 22, left face 24, and right face 26 may define void 14 as a rectangular void, as shown.

Figure 1B:
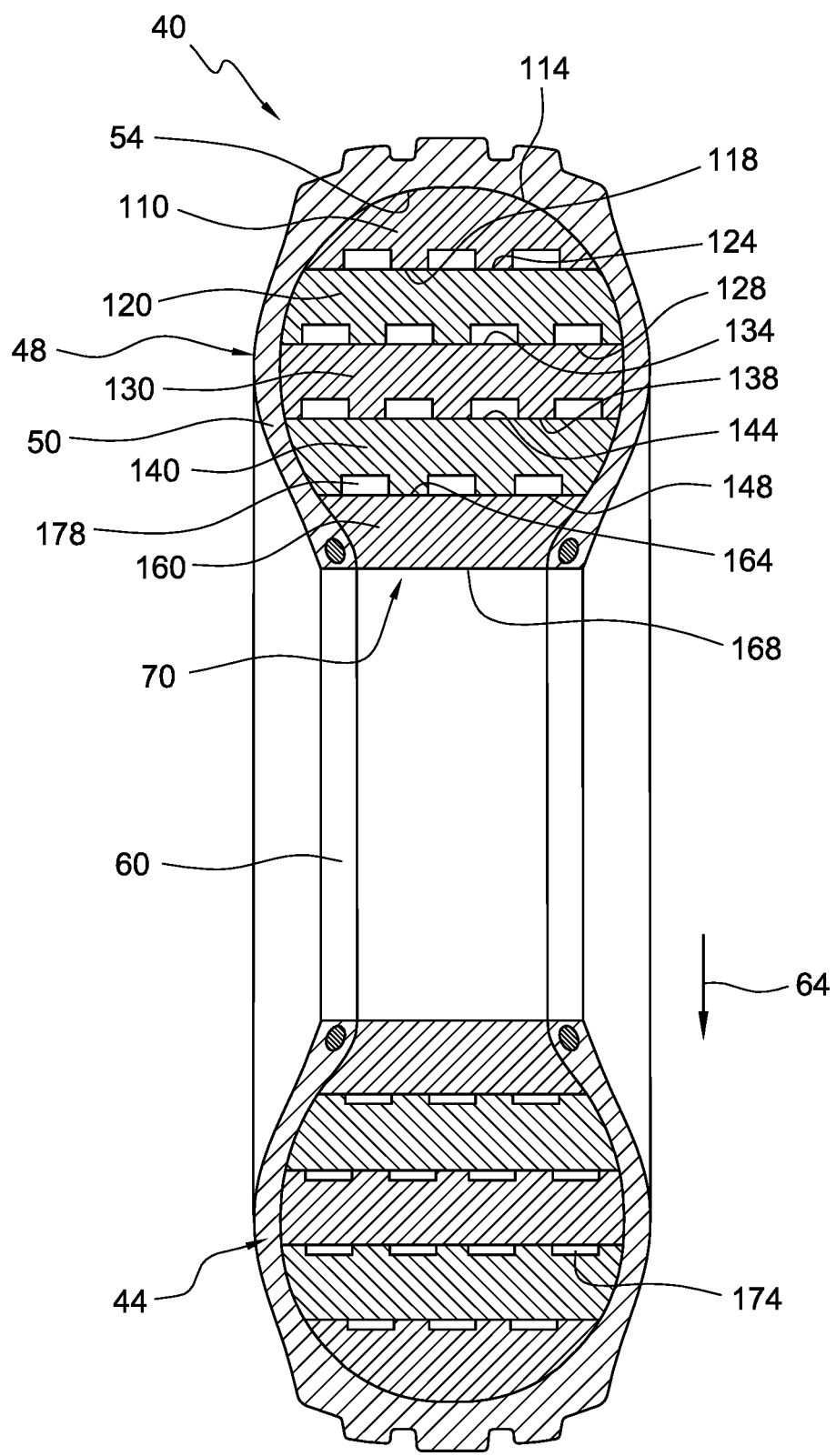
FIG. 1B is a sectional view of a filled tire, showing a number of the layers according to FIG. 1A installed in a tire casing, and under load.

FIG. 1B shows a number of layers 10 according to FIG. 1, installed in a tire 40 having a tire casing 50. Casing 50 has an inside diameter 54. Tire 40 is shown installed on a rim 60. Rim 60 may be mounted on an unillustrated wheel on an axle of a vehicle, such as a truck, or a piece of construction or mining equipment. When installed on a vehicle, a downward force 64 is exerted on rim 60; and, thus, on tire 40, as viewed in FIG. 1B.

Illustrated filled tire 40 of FIG. 1B is shown filled with layers 10 of FIG. 1A.

Further, a fill 70 is shown in FIG. 1B provided in the interior of casing 50. Fill 70 may include one or more layers 10, and for ease of discussion, the first through fourth layers will be identified as follows.

A first layer 110 may have an outside diameter 114 and an inside diameter 118. Outside diameter 114 is the same as inside layer 54 of casing 50.

A second layer 120 may have an outside diameter 124 and an inside diameter 128. Outside diameter 124 is the same as inside diameter 118 of first layer 110.

A third layer 130 may have an outside diameter 134 and an inside diameter 138. Outside diameter 134 is the same as inside diameter 128 of second layer 120. Third layer 130 may be directly adjacent the second layer 120. The second layer may be directly adjacent first layer 110.

A fourth layer 140 may have an outside diameter 144 and an inside diameter 148. Outside diameter 144 is the same as inside diameter 138 of third layer 130.

There may be a further layer 160 which has no voids, and which may be provided between rim 60 and fourth layer 140.

Further layer 160 likewise has an outside diameter 164 and an inside diameter 168.

Figure 1C:
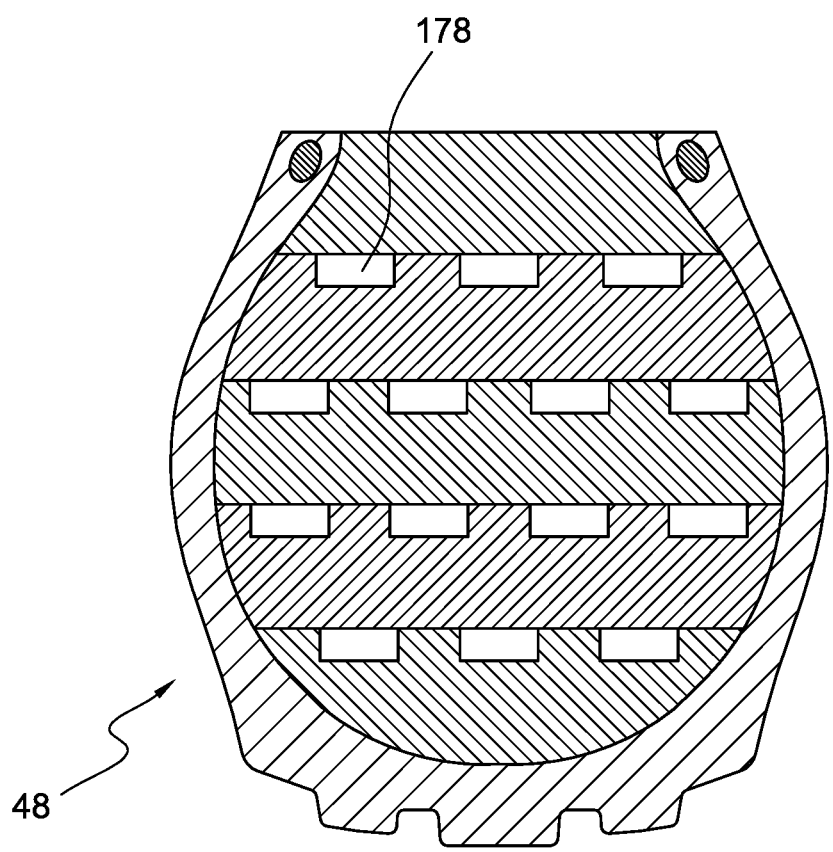
FIG. 1C is a sectional view of an upper part of the filled tire of FIG. 1B (FIG. 1C is inverted for ease of comparison with other sectional views)

FIG. 1C is a sectional view of upper part 48 of filled tire 40 of FIG. 1B showing voids 14, which are uncompressed and are designated as voids 178 for ease of discussion.

Figure 1D:
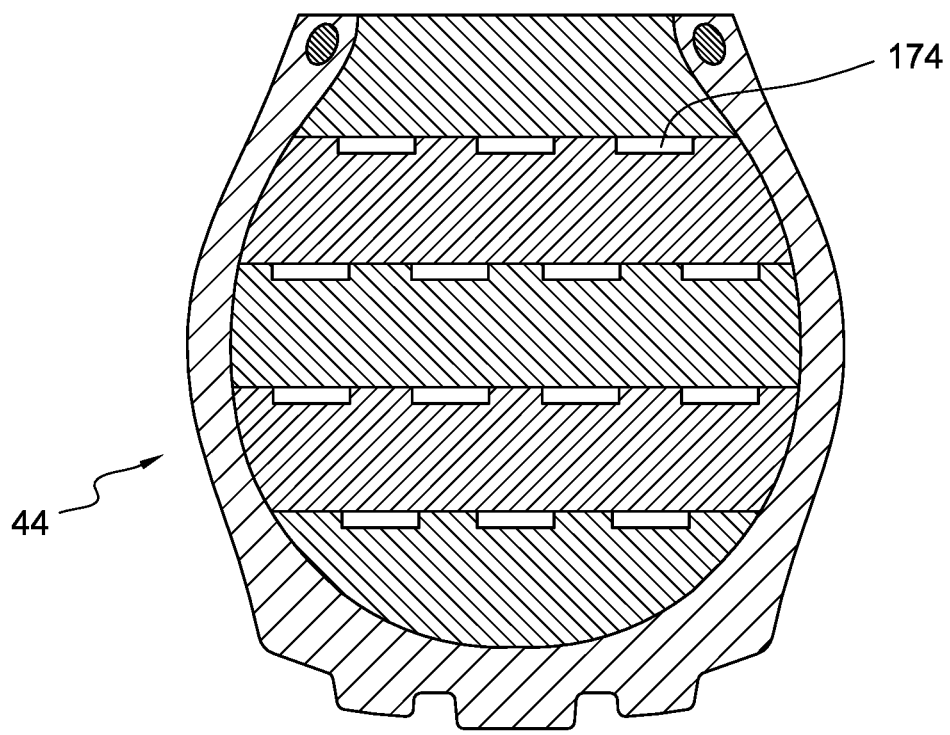
FIG. 1D is a sectional view of a lower part of the filled tire of FIG. 1B.

FIG. 1D is a sectional view of lower part 44 of filled tire 40 of FIG. 1B under load by downward force 64, and showing compressed voids as discussed above, and are designated as voids 174 for ease of discussion.

Downward force 64 compresses voids 14 into compressed voids 174, as shown in a lower portion 44 of filled tire 40. Downward force 64 exerts loads on that lower portion 44, while an upper portion 48 of filled tire 40 is subject to little force as compared to lower portion 44. Thus, voids 14 in filled upper portion are uncompressed and designated 178. Compression of voids of layer 10 is shown and described further below in connection with FIG. 3A.

FIG. 1D is a sectional view of upper part of the filled tire of FIG. 1C showing uncompressed voids 178 discussed above.

Figure 1E:
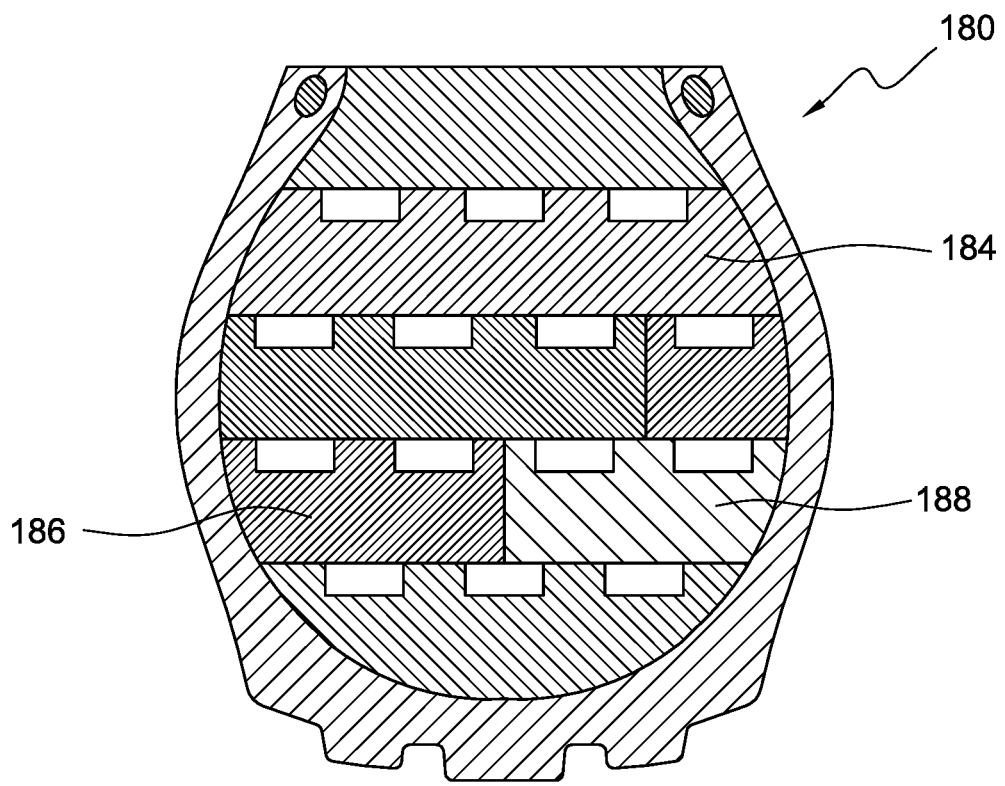
FIG. 1E is a sectional view of a filled tire filled with a number of layers according to a further embodiment.

FIG. 1E is a sectional view of a filled tire 180 according to a further embodiment. Filled tire 180 may be filled with a layer 184 which extends the full width of the fill. There may be a further layer 186 which spans, in part, a width of the filled tire 180. Another layer 188 which spans another part of the width of the filled tire 180 spanned in part by further layer 186 may be provided.

Figure 2A:
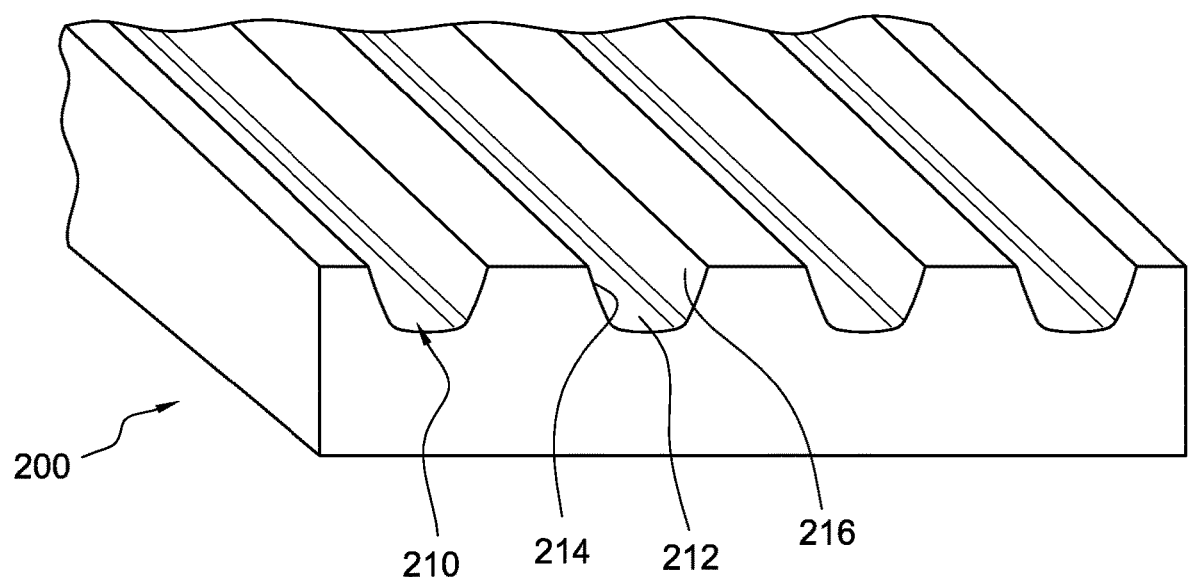
FIG. 2A is a front perspective view of another embodiment of a layer having open voids.

FIG. 2A is a front perspective view of another embodiment of a layer 200 having open voids 210. Open voids 210 may include a lower face 212, a left face 214, and a right face 216. Lower face 212, left face 214, and right face 216 may define void 210 as a substantially trapezoidal void 210, as shown.

Figure 2B:
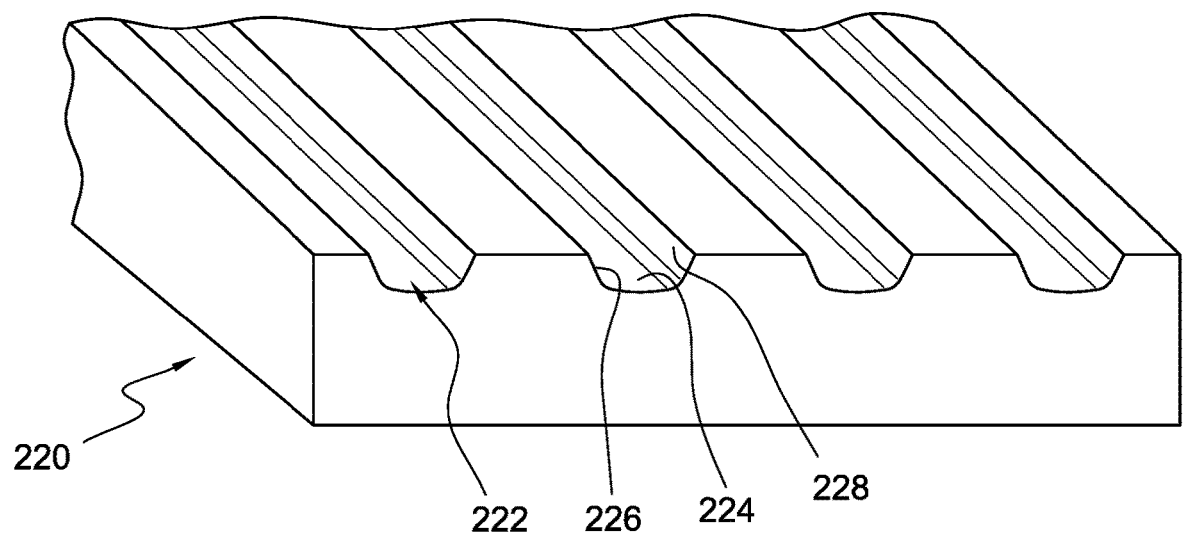
FIG. 2B is a front perspective view of a further embodiment of a layer having open voids.

FIG. 2B is a front perspective view of a further embodiment of a layer 220 having open voids 222.

Open voids 222 may include a lower face 224, a left face 226, and a right face 228. Lower face 224, left face 226, and right face 228 may define open void 222 as a further substantially trapezoidal void, as shown.

Figure 2C:
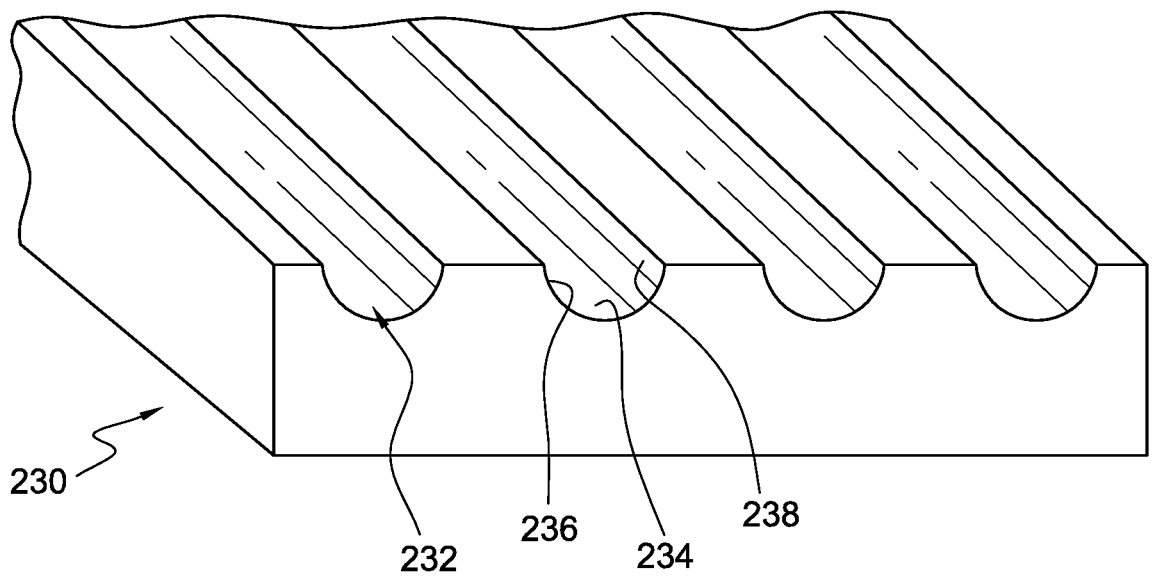
FIG. 2C is a front perspective view of another embodiment of a layer having open voids.

FIG. 2C is a front perspective view of another embodiment of a layer 230 having open voids 232. Open voids 232 may include a lower face 234, a left face 236, and a right face 238. Lower face 234, left face 236, and right face 238 may define open void 232 as a substantially semicircular void 232, as shown.

Figure 2D:
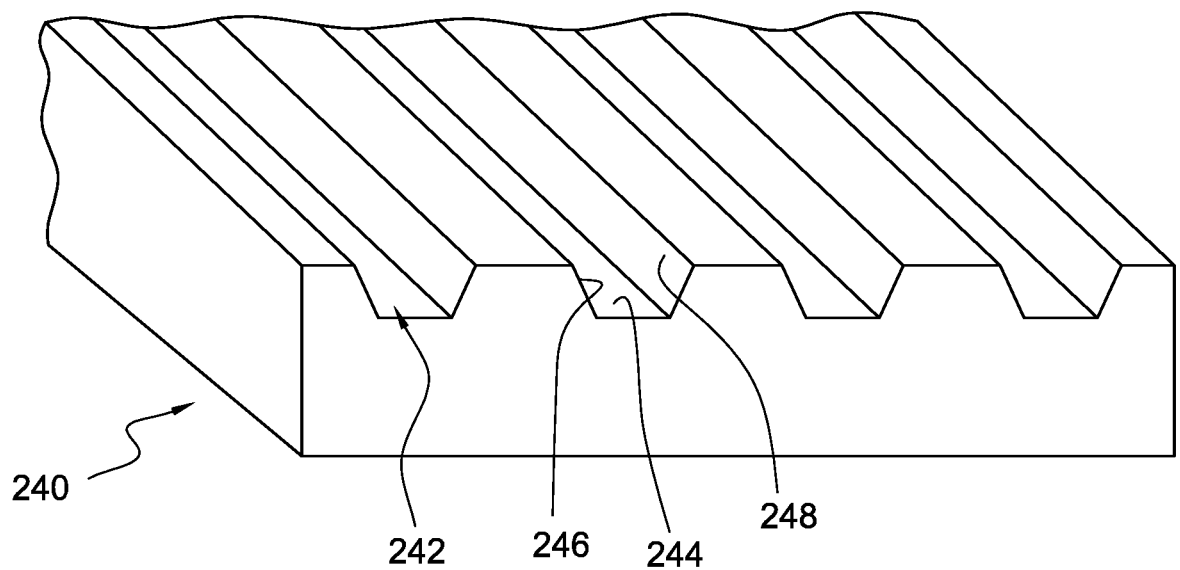
FIG. 2D is a front perspective view of a further embodiment of a layer having open voids.

FIG. 2D is a front perspective view of another embodiment of a layer 240 having open voids 242. Open voids 242 may include a lower face 244, a left face 246, and a right face 248 which may a further substantially trapezoidal void 242, as shown.

Figure 3A:
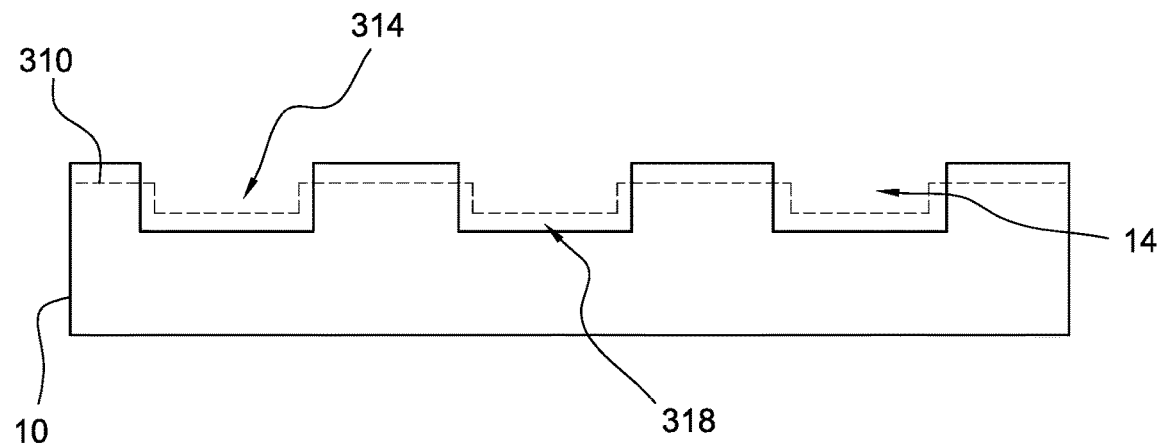
FIG. 3A shows the layer having open voids according to FIG. 1A when the layer is under load.

FIG. 3A shows layer 10 having open voids 14 according to FIG. 1A when the layer is compressed under load. For example, when tire 40 is filled with four layers 10, designated as first layer 110, second layer 120, third layer 130, and fourth layer 140, and filled tire 40 is loaded as described above in connection with FIG. 1B. In FIG. 1B casing 50 is compressed, each of the layers is compressed, and the respective open voids of the compressed layers are partially filled by the respective compressed layers. Third layer 130 may be provided adjacent second layer 120, and third layer 130 having an outside diameter, the outside diameter being the same as the inside diameter of second layer 120. Third layer 130 may have a face and open voids 14; open voids 14 of the third layer having respective first volume and being open to the face. When the tire is loaded and the casing is compressed third layer 130 is compressed, and respective open voids of the compressed third layer are partially filled by the compressed third layer, the respective partially filled open voids of the compressed third layer having a respective second volume; the respective first volumes of the third layer being greater than the respective second volumes of the compressed third layer.

That is shown in FIG. 3A having uncompressed layer 10 in solid line, and on which its compressed form shown as a compressed layer 310 is shown in broken line.

Also, the respective partially filled open void of the compressed layer 310 has a second volume 314, and the respective first volume 318 of uncompressed layer 10 is greater than second volume 314 of compressed layer 310.

Figure 3B:
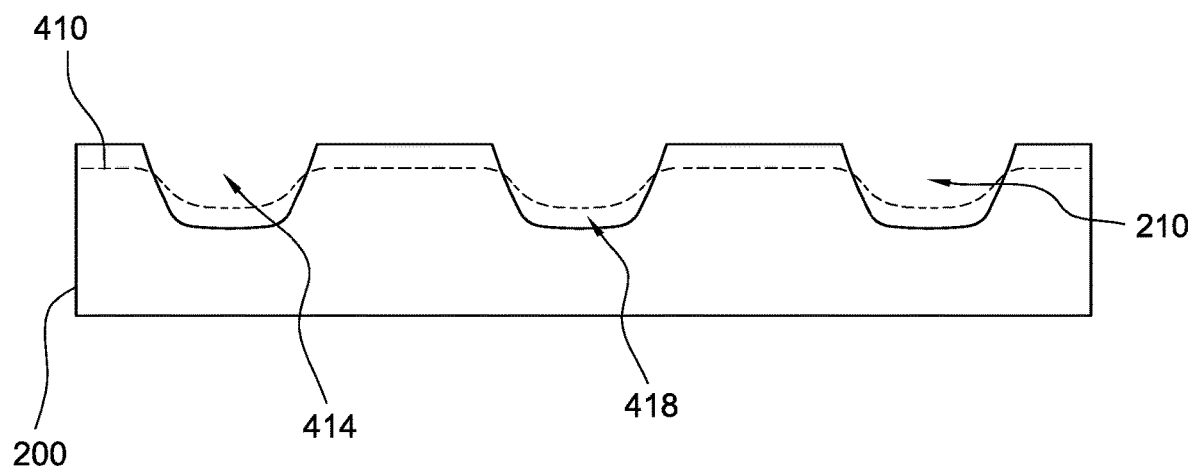
FIG. 3B shows the layer having open voids according to FIG. 2A under load.

FIG. 3B shows layer 200 having open voids 210 of FIG. 2A when layer 200 is compressed under load, such as described above in connection with FIGS. 3A and 1B. FIG. 3B has uncompressed layer 200 shown in solid line, and on which its compressed form shown as a compressed layer 410 is shown in broken line.

That respective partially filled open void 210 of the compressed layer 410 has a second volume 414, and the respective first volume 418 of uncompressed layer 200 is greater than second volume 414 of compressed layer 410.

Figure 4A:
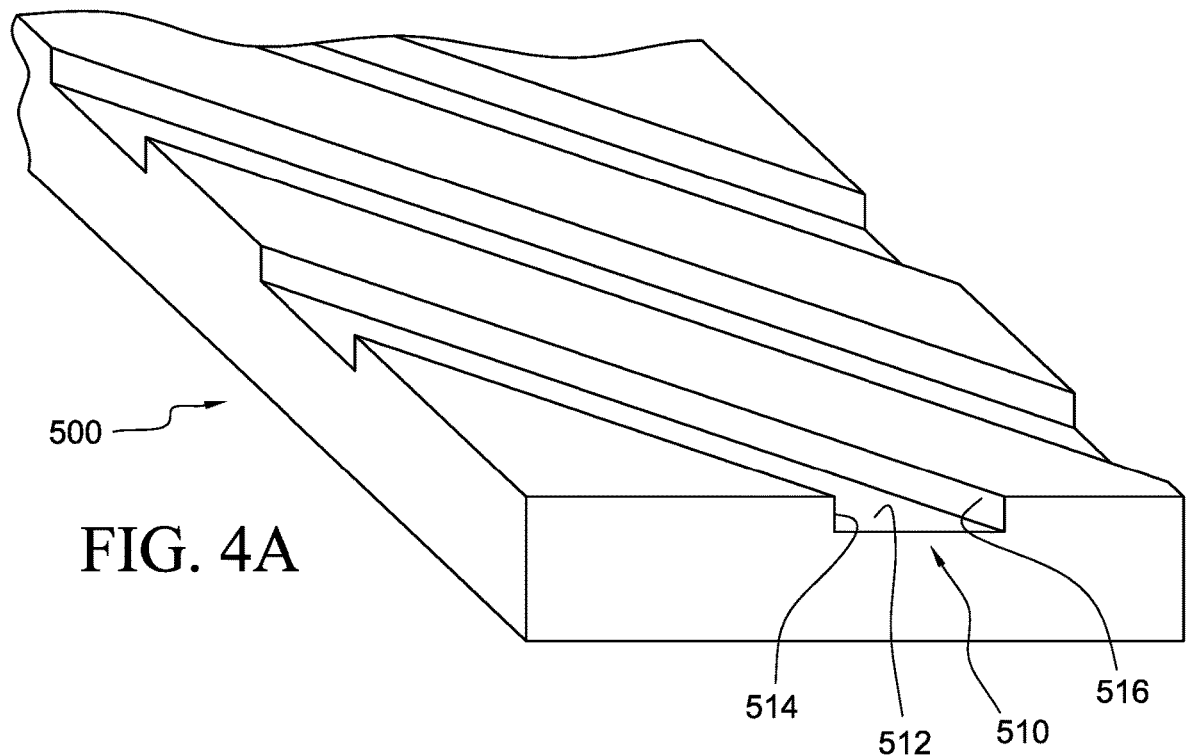
FIG. 4A is a front perspective view according to another embodiment of a layer having open voids.

FIG. 4A is a front perspective view of another embodiment of a layer 500 having open voids 510. Open voids 510 may include a lower face 512, a left face 514, and a right face 516 which define a rectangular void 510, as shown.

Open voids 510 may extend widthwise across layer 500 at an angle of about 35 degrees. That is, in a range of 35-39 degrees.

Figure 4B:
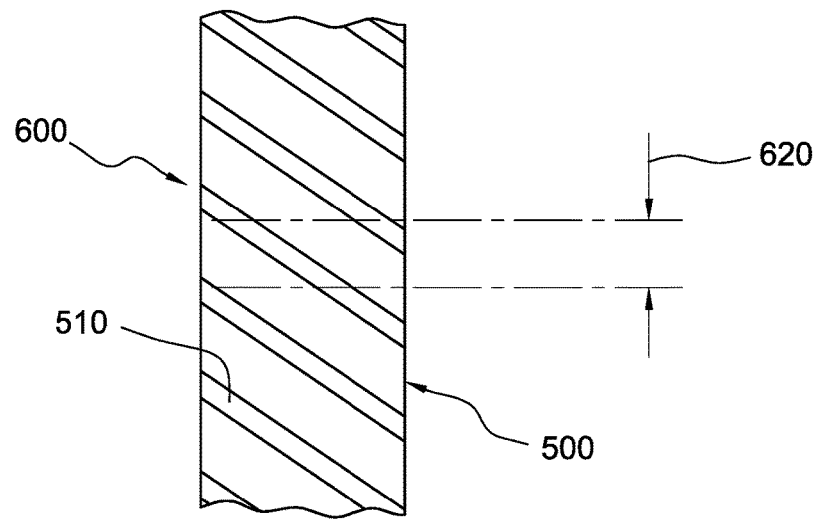
FIG. 4B is a schematic bottom view of the layer of 4A in use inside a tire (omitted for clarity) showing the width of tread contact with the ground.

FIG. 4B is a schematic bottom view of a footprint of an unillustrated tire showing the width 620 of tread contact with the ground of the tire and layer 500 having voids 510, and which layer 500 is inside the unillustrated tire.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. A tire, comprising:
a) a casing defining an interior;
b) the casing having an inside diameter;
c) a fill provided in the interior of the casing, the fill including a first layer and a second layer, the second layer being adjacent the first layer;
d) the first layer having an outside diameter and an inside diameter, the outside diameter being the same as the inside diameter of the casing for contacting the casing;
e) the first layer having a face and open voids, the open voids of the first layer having a first volume and being open to the face;
f) the second layer having an outside diameter, the outside diameter being the same as the inside diameter of the first layer;
g) the second layer having a face and open voids, the open voids of the second layer having a respective first volume and being open to the face;
h) each of the first and second layers having a longitudinal axis, and being elongated along the longitudinal axis, and having a first free end and a second free end spaced dart from the first free end;
i) each of the first and second layers having a width; and
j) each of the open voids of the respective first and second layers extending across the width at an angle of 30-40 degrees relative to the longitudinal axis of the first and second layers.

2. The tire according to claim 1, wherein:
a) when the tire is loaded the casing is compressed and each of the first and second layers is compressed, the respective open voids of the compressed first and second layers are partially filled by the respective compressed first and second layers, the respective partially filled open voids of the compressed first and second layers have a respective second volume, and the respective first volumes of the first and second layers are greater than the respective second volumes of the compressed first and second layers.

3. The tire according to claim 1, wherein:
a) each of the open voids of the respective first and second layers extends across the width at an angle of 35 degrees relative to the longitudinal axis of the first and second layers.

4. The tire according to claim 1, wherein:
a) the fill includes a third layer provided adjacent the second layer;
b) the third layer has an outside diameter, the outside diameter being the same as the inside diameter of the second layer; and
c) the third layer has a face and open voids, and the open voids of the third layer have a respective first volume and are open to the face.

5. The tire according to claim 4, wherein:
a) when the tire is loaded and the casing is compressed the third layer is compressed, the respective open voids of the compressed third layer are partially filled by the compressed third layer, the respective partially filled open voids of the compressed third layer have a respective second volume, and the respective first volumes of the third layer are greater than the respective second volumes of the compressed third layer.

6. The tire according to claim 5, wherein:
a) a material of the third layer is the same as a material of the first and second layers.

7. The tire according to claim 1, wherein:
a) a material of the second layer is the same as a material of the first layer.

8. The tire according to claim 1, wherein:
a) the fill includes natural rubber.

9. The tire according to claim 1, wherein:
a) the fill includes synthetic rubber.

10. The tire according to claim 7, wherein:
a) the material has a durometer of 35 to 60.

11. The tire according to claim 4, wherein:
a) the third layer is directly adjacent the second layer.

12. The tire according to claim 11, wherein:
a) the second layer is directly adjacent the first layer.

13. The tire according to claim 1, wherein:
a) the second layer is directly adjacent the first layer.

* * * * *